Figure 1:
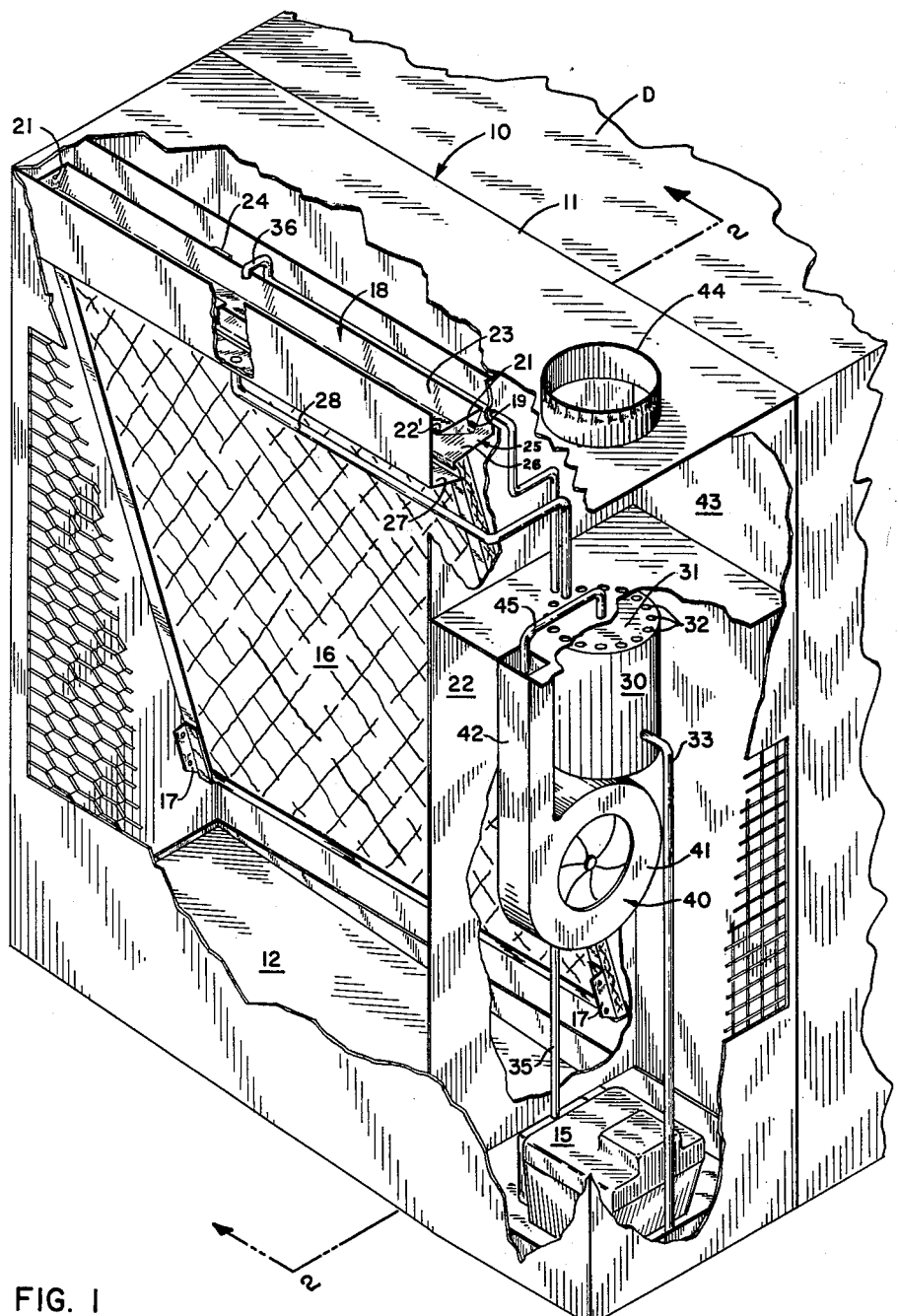

Oct. 1, 1963     G. G. GEBERT ETAL     3,105,749
AIR PURIFYING MEANS AND METHOD
Filed March 30, 1959     2 Sheets-Sheet 1

INVENTORS
GREGORY G. GEBERT
and
BY    JOHN R. SCHREINER

*ATTORNEY*

INVENTORS
GREGORY G. GEBERT
and
JOHN R. SCHREINER
BY
ATTORNEY

United States Patent Office 3,105,749
Patented Oct. 1, 1963

3,105,749
AIR PURIFYING MEANS AND METHOD
Gregory G. Gebert, North Syracuse, and John R. Schreiner, Liverpool, N.Y., assignors to Carrier Corporation, Syracuse, N.Y., a corporation of Delaware
Filed Mar. 30, 1959, Ser. No. 802,703
3 Claims. (Cl. 55—47)

This invention relates to air conditioning, more particularly to means for purifying air.

In the air conditioning of any given area, one of the desiderata is the provision of pure air, relatively free of odors and other undesirable foreign material. This is generally accomplished by filtration of the air in the conditioned area. A variety of filtration means have been evolved, which serve to eliminate foreign matter, and odors from the air. These filtration means employ screens, liquid baths, sprays, and the like. However, these conventional filtration means require periodic replacement of the filter elements, which become ineffective due to clogging by the filtered material. With a view to eliminating the need for periodic replacement, self-cleaning filter structures have been developed. There are a variety of types employed: mechanical, fluid, chemical, and a combination of these types. An effective air purifying means which has been evolved employs triethylene glycol or diethylene glycol in combination with a mechanical filter, such as a screen, through which the conditioned air stream is passed. The surface tension of the triethylene glycol or diethylene glycol serves to cause any foreign particles in the air stream to adhere thereto and serves further to absorb most foul odors in the air. The glycol is thereafter passed through a desorbing chamber where it is cleaned for re-use. Effective distribution of the glycol over the mechanical filter, and effective desorption of the foreign odors from the glycol presents a variety of problems.

It is with these problems in mind that the present means have been evolved, means providing for effective distribution of an air purifying medium over a contact surface bringing the purifying medium into intimate contact with the air to be purified and subsequent cleaning and desorption of said medium to regenerate same.

It is accordingly a primary object of this invention to provide improved air purifying means for use in air conditioning.

A further object of the invention is to provide improved odor absorption means for use in air conditioning.

Another object of this invention is to provide an effective means of employing a liquid air purifying medium in combination with a solid screen for odor absorption purposes.

An additional object of this invention is to provide effective means for distribution of a liquid over a surface.

An additional object of the invention is to provide means including a novel apparatus and method for desorbing any odors from a liquid after absorption of odors by said liquid to regenerate same for re-use.

A further object of the invention is to provide means for dissipating any odors desorbed from an odor absorbing medium.

These and other objects of the invention which will become hereinafter more apparent are attained by provision of novel air purifying means particularly adapted for use in an air conditioning system designed to bring air of desired properties to a conditioned area. These air purifying means comprise a contact surface in the form of a screen member arranged with one end higher than the other, and a tiltably mounted distribution trough arranged to extend over the higher end of said screen member. The trough is designed to receive and hold a fluid purifying medium such as triethylene glycol or diethylene glycol. A fluid sump is arranged beneath the screen member to catch any fluid draining therefrom and a pump with an appropriate conduit directs fluid from the sump to the trough. When the trough has been sufficiently filled, it tilts to distribute fluid uniformly over the screen member. A desorbing chamber or regenerator is arranged at the side of the screen and a bypass line leads a portion of the fluid distributed from the trough to the regenerator. A blower pumps air into the heated regenerator with one portion of the air stream set up by said blower being employed to agitate the fluid in said desorbing chamber, and another portion of the air stream set up by said blower serving to drive off any desorbed odors.

An important feature of the invention resides in the arrangement of a blower providing an air stream serving to agitate and aerate the fluid in the desorbing chamber or regenerator; and additionally sets up an air stream serving to dissipate the foul odors desorbed from the filtration fluid.

Another feature of the invention resides in the fact that a portion of the filtration fluid is passed through the regenerator whereby efficient regeneration of the filter fluid is accomplished without circulation of all of the fluid through the regenerator during each cycle.

Figure 2:
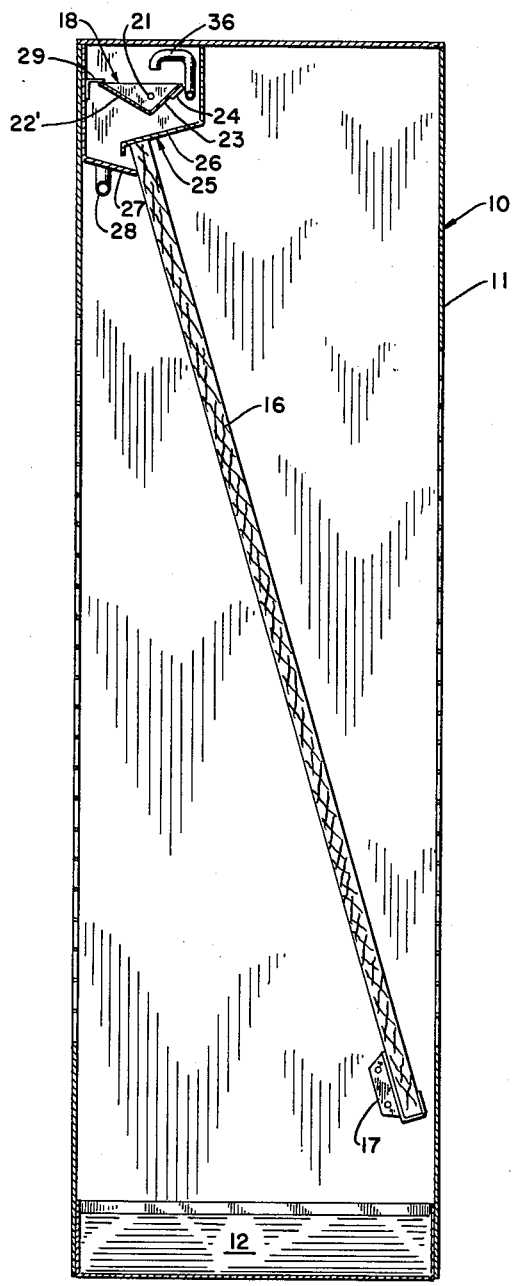

The specific constructional details of the invention, and their mode of functioning, will be made most manifest and particularly pointed out in full clear, concise, and exact terms in conjunction with the accompanying drawings wherein:

FIGURE 1 represents a somewhat diagrammatical perspective view of a novel air purifying structure, with parts broken away to reveal the structural details thereof; and FIGURE 2 is a cross sectional view on line 2—2 of FIGURE 1 illustrating the inter-relationship of the filtration fluid distribution trough and the filter screen.

Referring now more particularly to the drawings, like numerals in the various figures will be taken to designate like parts. As best seen in FIGURE 1, the novel air purifying means 10 includes a housing 11 formed of sheet metal or the like. This housing is shown arranged in combination with the duct D of an air conditioning system bringing air to a conditioned area.

Within housing 11, a sump 12 slopes downwardly (to the right as viewed in FIGURE 1) to a fluid pump 15. Arranged above sump 12 in an inclined substantially vertical plane, here shown as extending from the front of casing 11 down to the rear thereof, is a contact surface in the form of filter screen 16 removably supported on sheet metal brackets 17.

Trough 18 formed of sheet metal is pivotally mounted by means of pivot pins 19 extending through shield plate 22 on one side (to the right as viewed in FIGURE 1) and the sidewall of the casing 11 (to the left as viewed in FIGURE 1). Pivot 21 is arranged in a vertical plane which extends through the apex of trough 18. The trough 18 is formed in the cross sectional shape of a scalene triangle having a longer leg 22' and a shorter leg 23. Arranged along shorter leg 23 is a counterweight 24 for a purpose to become hereinafter more apparent.

A trough tray assembly 25 is arranged beneath trough 18. Tray assembly 25 comprises a downwardly inclined baffle plate 26, and distribution plate 27 arranged beneath baffle 26 and extending to the screen 16. Leading from distribution plate 27 is a fluid bypass line 28 leading to regenerator tank 30.

Regenerator tank 30 as seen is formed in the shape of a closed cylinder having a top cover plate 31 provided with apertures 32 for a purpose to become hereinafter more apparent. Fluid return line 33 leads from the regenerator 30 to sump 12, containing pump 15. Pump 15 directs fluid from sump 12 through fluid supply line 35 to outlet spout 36 positioned over trough 18.

A blower 40 here shown as of a squirrel cage type arranged within scroll 41 directs air through duct 42 to a plenum chamber 43 within casing 11. Plenum chamber 43 is formed above cover plate 31 of regenerator 30, and is provided with an exhaust flue 44.

Within duct 42 a regenerating air stream supply conduit 45 is arranged to direct air down into regenerator 30.

The aforedisclosed air purifying means 10 is intended for use in conjunction with an air conditioning system, said purifying means being arranged in the air handling duct work of said system so that the air stream passing to the conditioned area will be purified. Screen 16 is arranged transversely to the air stream so that the air in passing into the conditioned area will pass through said screen.

In operation pump 15 and blower 40 are set into operation. Pump 15 draws the filtration fluid, triethylene glycol, up from sump 12 through supply line 35 to outlet spout 36 whence the fluid is distributed into trough 18. Counterweight 24 serves to orient trough 18 to the fluid receiving position shown in FIGURE 1. When the trough 18 has been filled by the triethylene glycol to a desired level, the weight of the fluid acting against its longer leg 22', causes the trough 18 to pivot about pivot pins 19 discharging its fluid content on to baffle plate 26, whence the fluid drains to distribution plate 27, which discharges the fluid over screen 16. If desired a stop 29 may be employed to limit rotational movement of the trough 18. A portion of the fluid discharged by trough 18 is removed by bypass line 28 to regenerator 30. In the regenerator 30, a regenerating air stream from blower 40 passes through conduit 45 to agitate and aerate the fluid in the regenerator 30 to aid in effecting the desorption of the odors from said fluid and regeneration of same. A heater (not shown) is provided in the regenerator 30 to aid in the regenerative process. The desorbed odors are forced by the air bubbles rising in the regenerated fluid to pass out through regenerator cover plate 31 via apertures 32 into plenum 43. The desorbed odors in plenum 43 are passed off by the air stream set up by blower 40 through duct 42, and thereafter the regenerated fluid is returned through return line 33 to sump 12 where it is mixed with the filtration fluid draining over screen 16. It will be observed that the fluid in draining over screen 16 serves to clean the screen.

It is thus seen that a novel air purifying system has been provided having a novel mode of functioning, whereby air may be purified by passing the air through a filtering means, including a solid screen and a fluid filtration medium (preferably triethylene glycol). With said fluid filtration medium serving to clean the screen and being thereafter regenerated in a novel fashion, with only a portion of the filtration fluid being regenerated at a time whereby maximum efficiency may be obtained.

The above disclosure has been given by way of illustration and elucidation and not by way of limitation and it is desired to protect all embodiments of the herein disclosed inventive concept within the scope of the appended claims.

We claim:

1. A method of purifying air, said method comprising the steps of directing the air to be purified through a screen; collecting a purifying medium above the screen; distributing the purifying medium over the screen; bypassing a portion of the distributed medium away from the screen; directing an air stream into an interior portion of the bypassed medium while applying heat thereto to regenerate same; directing an air stream over the regenerated medium to pass off any impurities released therefrom; and returning the regenerated medium to the collected medium above the screen.

2. An air purifying apparatus comprising a screen arranged in contact with the air to be purified; a sump beneath said screen containing a liquid air purifying medium; a pump directing the medium from said sump over said screen; a bypass line directing a portion of the liquid pumped away from the screen; a regenerator receiving the bypassed portion; a blower arranged adjacent said screen; a conduit leading air from said blower into the liquid in the regenerator; a duct leading air from the blower over the regenerator to pass off any impurities released during regeneration; and a return line from the regenerator to the sump, returning the regenerated fluid thereto.

3. An air purifying apparatus comprising a screen arranged in contact with the air to be purified; a sump beneath said screen containing a liquid air purifying medium; distribution trough arranged over said screen; a pump directing the medium from the sump to the trough; a bypass line directing a portion of the liquid away from said trough; a regenerator receiving the bypassed portion; a blower arranged adjacent said screen; a conduit leading air from said blower into the liquid in the regenerator; a duct leading air from the blower over the regenerator to pass off any impurities released during regeneration; and a return line from the regenerator to the sump returning the regenerated fluid thereto.

References Cited in the file of this patent

UNITED STATES PATENTS

| | | |
|---|---|---|
| 2,147,248 | Fleisher | Feb. 14, 1939 |
| 2,239,190 | Chambers | Apr. 22, 1941 |
| 2,839,274 | Polin | June 17, 1958 |